United States Patent
Culver

[19]

[11] Patent Number: 5,923,694
[45] Date of Patent: Jul. 13, 1999

[54] WEDGE SIDE PUMPING FOR FIBER LASER AT PLURALITY OF TURNS

[75] Inventor: William H. Culver, Washington, D.C.

[73] Assignee: Opteleacom, Inc., Gaithersburg, Md.

[21] Appl. No.: 08/887,255

[22] Filed: Jul. 2, 1997

[51] Int. Cl.[6] .................................................. H01S 3/091
[52] U.S. Cl. .................................... 372/69; 372/6; 385/32
[58] Field of Search ................................ 372/6, 69, 70, 372/75; 385/15, 27, 32

[56] References Cited

U.S. PATENT DOCUMENTS

| | | | |
|---|---|---|---|
| 3,938,974 | 2/1976 | Macedo et al. | 65/399 |
| 4,015,217 | 3/1977 | Snitzer | 372/6 |
| 4,815,079 | 3/1989 | Snitzer et al. | 372/6 |

*Primary Examiner*—John D. Lee
*Attorney, Agent, or Firm*—William L. Feeney; Kerkam, Stowell, Kondracki & Clarke, P.C.

[57] ABSTRACT

A pumped fiber laser including turns of optical fiber defining a wound pack, wherein the optical fiber includes a core, a cladding around the core and a concentric layer of a porous glass matrix material, such as sol-gel, around the cladding. The fiber laser further includes a pumping laser, preferably in the form of a semiconductor laser bar, having lasing regions each being operable to generate light, and a wedge device for directing the light from the lasing regions into the side of the optical fiber at a plurality of different turns thereof, respectively.

20 Claims, 3 Drawing Sheets

WEDGE SIDE PUMPING FOR FIBER LASER AT PLURALITY OF TURNS

FIELD OF THE INVENTION

The present invention relates to fiber lasers, and, more particularly, to an improved system for pumping a fiber laser in the form of a wound pack or coil, wherein more power from a less coherent light source can be injected into bound modes of the fiber cladding as compared to conventional pumping systems. The invention further provides an improved wound pack of optical fiber having advantageous characteristics which facilitate efficient pumping of the laser with a less coherent light source, and which is more durable and reliable than conventional wound optical fiber packs.

BACKGROUND OF THE INVENTION

In an optical fiber, light is guided by total internal reflection (TIR) in a transparent core surrounded by a transparent cladding of lower index of refraction. Under ideal lossless conditions, light can be guided with nearly perfect efficiency. In practice, however, fibers can be affected with a variety of more or less severe losses.

At least three major loss mechanisms that reduce transmission efficiency have been identified: 1) absorption, resulting from impurities in the core or cladding, causes an exponential reduction in transmission with propagation distance; 2) Rayleigh scattering caused by localized variations in the refractive index of the core and cladding; and 3) imperfections in the core/cladding interface. Substantial progress has been made in improving fiber performance by reducing or minimizing such losses. These improvements have resulted in broadened applications for optical fibers. For example, optical fibers have become attractive as laser oscillators and amplifiers. Such devices combine the excellent properties of laser materials with the high energy confinement available in optical fibers. In particular, single mode fibers have been adapted as optical fiber lasers for a variety of system applications. Such fibers exhibit large energy conversion efficiencies and have excellent coupling properties to single mode transmission fibers, and therefore, result in a high power laser that has numerous important applications, such as in telecommunications fiber transmission systems and networks, as well as other optical fiber communications systems.

As with other types of lasers, the performance of optical fiber lasers is measured in terms of slope efficiency. The ultimate performance of a fiber laser device having a known quantum efficiency, i.e. the maximum probability that a photon of a particular wavelength produced by a pump source will be converted to laser light at the wavelength of interest, is related to the slope efficiency. The slope efficiency is the efficiency with which pump radiation can be absorbed and converted to useful laser light by the active material in the fiber core. Snitzer et al., U.S. Pat. No. 4,815,079, issued on Mar. 21, 1989, for example, discloses a fiber configuration which attempts to efficiently couple radiation to an active single mode core enclosed within a relatively large multimode cladding which, in turn, is surrounded by a light confining outer cladding.

An optical fiber laser is typically pumped from the end of the fiber, but such fibers have also been pumped from the side. There are certain problems that arise when attempting to side-pump a wound pack of optical fiber. For example, as explained in more detail below, the outer protective buffer on the fiber typically must be removed to allow access for the pump energy to the fiber cladding surrounding the core. Removing the buffer exposes the fiber to damage which degrades the reliability of the wound fiber pack. Moreover, if the fiber is wound without the buffer it will likely be damaged during the winding process. As a result of these and other problems heretofore encountered when attempting to side-pump an optical fiber laser in the form of a wound pack, such packs are typically pumped only at the ends of the fiber.

End-pumping an optical fiber has numerous disadvantages, particularly when the pump source is a multispacial mode pump source, such as a semiconductor laser bar or the like. One of the properties of a light source is its radiance which is defined as the amount of light per unit area per unit solid angle that is emitted therefrom. A series of lenses can be used, for example, to change the area of the light beam, but in doing so, the solid angle that the light goes into is reduced. A laser has a very high radiance. However, semiconductor lasers that are used to pump fiber lasers do not have as high a radiance as other laser sources can achieve in accordance with fundamental principles. More particularly, semiconductor lasers are generally provided in the form of an array of semiconductor laser elements, wherein there is a space between each of the lasing regions defining the array. The extra area resulting from the spaces in the array reduces the radiance of the light emitted therefrom. As a result, it is difficult to get light from several different semiconductor lasers into the end of the fiber, due to the relatively low radiance and the limited available cladding area at the end of the fiber. In other words, while semiconductor laser bars are very efficient sources of power, the disadvantage is that they are incoherent. Thus, in order to end-pump with such semiconductor lasers, the laser elements or diodes must be run very hard, i.e. with a high current, which significantly reduces the lifetime of the semiconductor laser. One problem currently being experienced in connection with semiconductor pumps for fiber lasers is that the pumps have a relatively short useful lifetime, due to degradation resulting from operation at such high levels to achieve the desired radiance therefrom. In addition, rather complicated optical arrangements and focusing schemes are used in order to deliver the light to the end of the fiber from all of the diodes in the semiconductor array. For telecommunications applications, hundreds of thousands of hours of useful lifetime is desired from such pumps, but currently available pumps only have a lifetime of approximately seven to ten thousand hours of useful lifetime when operated at such high levels. High current causes various kinds of migration of the material comprising the semiconductor laser and other phenomenon which degrade the device and eventually result in the failure thereof.

Optical fiber made by a process known as the sol-gel process results in a glass that has a lesser density than the usual bulk glass. Sol-gel glass is an optically transparent amorphous silica or silicate material produced by forming interconnections in a network of colloidal, submicrometer particles under increasing viscosity until the network becomes completely rigid, and having space between the particles, and thus having less density than the bulk material. Fibers of pure $SiO_2$ have been made by the sol-gel process at Ceram Optics in which the center of the fiber comprising the core has a higher density, and thus a higher refractive index, than the outside layer comprising the fiber cladding. The cladding in this type of fiber is a porous glass matrix, such as sol-gel glass, and the pores in the cladding lower the density and, therefore, the refractive index of the glass and enables light to be trapped in the core of the fiber. Fibers made using a porous glass matrix are disclosed, for example, in the patent to Macedo et al, U.S. Pat. No. 3,938,974, which patent is hereby incorporated by reference herein.

A known advantage of the sol-gel fiber is that it is all quartz, and the optical fiber can be made without the need for using conventional dopants, such as germanium, to achieve a higher refractive index in the fiber core to trap the light therein. This is advantageous because the use of dopants can be problematic in a radiation environment. More particularly, dopants may react with radiation and cause the fiber to become light absorbing, an obviously undesirable feature for an optical fiber in a communication or sensing application.

On the other hand, a disadvantage of the sol-gel fiber is that it does not cleave in a clean plane, as does the usual $SiO_2$ (fused quartz) fiber. The failure to cleave in a clean plane is caused by the fact that very minute pores in the quartz interfere with the usual crack propagating mechanism. A very small flaw in a fuzed quartz fiber can easily propagate in the presence of strain and water vapor. The crack propagation process is inhibited in the porous sol-gel fiber. Therefore, the sol-gel fiber is more rugged and cracks will not propagate and break the fiber until higher stresses are applied.

Generally, optical fibers are made such that they include an outer plastic buffer which is applied immediately or in-line during the fiber manufacturing process. More particularly, when a fiber preform is being drawn using a furnace, the plastic buffer is applied to the fiber and heat treated in-line in order to protect the fiber. In order to avoid any scratches or minute cracks on the cladding, the buffer must be applied immediately and in a very clean environment. Touching the fiber without the buffer weakens the fiber, due to the fact that minute scratches or cracks are formed that will propagate through the typical $SiO_2$ fiber and eventually cause the fiber to crack and break, particularly during a fiber handling process, such as winding the fiber on a mandrel to form a wound pack of fiber. Thus, if the buffer is removed from the fiber, such as by hot nitrogen or other gases, as is often necessary to enable splicing of fibers, the cladding must be kept very clean and handling of the fiber must be avoided or minimized until the splicing is complete and the buffer is reconstituted over the cladding. Known but expensive techniques and machines exist to prevent the occurrence of scratches on the cladding and to enable such splicing to be performed with minimum damage to the fiber. However, if scratches on the fiber do occur, then the integrity of the fiber is compromised and handling the fiber in the course of winding the fiber to form the wound pack, for example, will eventually cause the fiber to crack.

SUMMARY OF THE INVENTION

Accordingly, a primary object of the present invention is to provide an improved pumped fiber laser.

A more particular object of the present invention is to provide an improved pumped fiber laser that can be side pumped without damaging the fiber.

Another object of the instant invention is to provide an improved pumped fiber laser in the form of a wound pack of optical fiber, wherein the wound pack is more durable than conventional packs.

Still another object of the present invention is to provide an improved pumped fiber laser, wherein the pumping laser can operate for long periods of time without failure.

Another object of the present invention is to provide an improved pumped fiber laser particularly suited for use in optical communications systems.

Yet another object of the instant invention is to provide an improved pumped fiber laser in the form of a wound pack which prevents cracking of the pack by inhibiting crack propagation therein.

Another object of the instant invention is to provide an improved pumped fiber laser in the form of a wound pack, wherein the optical fiber can be wound to form the pack and otherwise handled without a plastic buffer and without adversely effecting the reliability thereof.

Still another object of the instant invention is to provide an improved pumped fiber laser which uses a relatively low radiance pumping laser but achieves a relatively high radiance output.

A further object of the instant invention is to enable a multispacial mode light source, such as a laser bar, to efficiently achieve a single mode laser output.

Yet another object of the instant invention is to provide an improved pumped fiber laser which side pumps the laser at each turn of the wound pack.

Still another object of the instant invention is to provide an improved fiber laser amplifier which provides distributed amplification.

These and other objects and advantages are achieved by the instant invention, which provides a pumped fiber laser including turns of optical fiber defining a wound pack, wherein the optical fiber includes a core, a cladding around the core and a concentric layer of a porous glass matrix material around the cladding. The fiber laser further includes a pumping laser having lasing regions each being operable to generate light, and means for directing the light from the lasing regions of the pumping laser into the side of the optical fiber at a plurality of different turns of the optical fiber, respectively.

In accordance with a more particular aspect of the present invention the porous glass matrix material is a sol-gel material.

In accordance with another aspect of the present invention the porous glass matrix material is the outermost layer of the optical fiber.

In accordance with yet another aspect of the present invention, the means for directing the light into the side of the fiber includes a wedge, wherein the wedge extends across at least one turn of the optical fiber and has a complimentary shape to that of the optical fiber.

In accordance with still a further aspect of the present invention, the means for directing the light into the side of the fiber further includes a lens element between the pumping laser and the wedge.

In accordance with still another aspect of the instant invention the lens element is a focusing lens element which focuses the light into the wedge.

In accordance with yet another aspect of the instant invention the wedge is connected to the side of the optical fiber with a refractive index matching adhesive.

In accordance with a further aspect of the instant invention the lens is a spreading lens which spreads the light so as to illuminate several turns of the optical fiber with the light from each of the lasing regions, respectively.

In accordance with a further aspect of the instant invention, the pumping laser is a semiconductor laser bar which preferably has a length which enables each turn of the optical fiber to be pumped.

BRIEF DESCRIPTION OF THE DRAWINGS

Other objects and advantages of the subject invention will become apparent from a study of the following description when viewed in light of the accompanying drawings, in which.

DETAILED DESCRIPTION OF THE PREFERRED EMBODIMENTS

Figure 1:
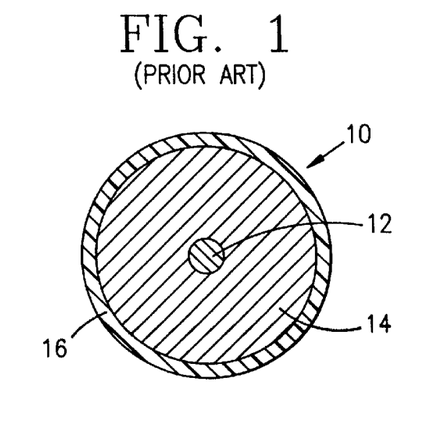
FIG. 1 is a schematic, cross-sectional view of an optical fiber constructed in accordance with the prior art.

Referring now to the drawings, wherein like reference numerals designate similar parts throughout the various views, FIG. 1 shows a conventional optical fiber 10 as typically used to construct a wound pack for use in a pumped fiber laser system. The optical fiber 10 includes a core 12, a cladding 14 and an outer buffer 16. The core 12 and the cladding 14 are typically drawn from a preform (not shown) which generally includes suitable dopants therein to provide a higher index of refraction in the core relative to the cladding, so as to enable light to be trapped within the core and produce an optical fiber. The buffer 16, which is typically a plastic buffer material, is applied as a protective coating in-line during the drawing process to protect the cladding 14 from being damaged by the environment or by anything making direct contact therewith that may scratch, crack or otherwise damage the fiber in any way. While the buffer 16 protects the fiber it has certain disadvantages as explained above. However, the buffer 16 was heretofore believed necessary to enable the fiber 10 to be wound onto a holding spool and otherwise handled during a coil winding process without damaging the fiber and reducing the reliability thereof. It is generally accepted in the art that, without the buffer 16, the winding process would result in a weak and unreliable fiber coil. More particularly, an unbuffered fiber would receive micro scratched and/or cracks during handling and winding that would eventually propagate across the entire fiber and cause the fiber to break, thereby destroying the operation thereof.

In order to overcome the disadvantages of using a buffer 16 on a optical fiber, the instant invention provides a improved fiber laser in the form of a wound pack that eliminates the buffer 16 but still provides a strong and reliable pack that is not susceptible to weakening during the pack winding process.

Figure 2:
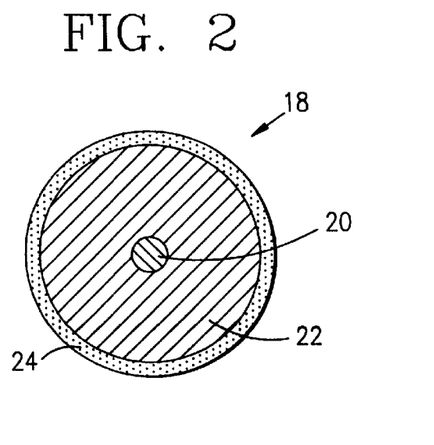
FIG. 2. is a schematic, cross-sectional view of an optical fiber constructed in accordance with the present invention.

The optical fiber 18 used to construct the instant improved fiber laser in accordance with the instant invention is shown in FIG. 2. The improved fiber 18 preferably includes the conventional $SiO_2$ (fused quartz) fiber that makes up the core 20 and cladding 22, as in the prior art fiber shown in FIG. 1. However, instead of the buffer 16, the improved fiber 18 includes a concentric outer layer 24 of a porous glass matrix material, such as sol-gel. The pores in the porous glass matrix outer layer 24 prevent any cracks, scratches or the like from propagating through the outer layer 24, thereby improving the integrity and reliability of the fiber 18 and any fiber laser that is made therewith.

While the fiber 18 is shown in FIG. 2 as having a conventional circular cross-section, the instant fiber 18 may have another shape, such as, for example, a generally rectangular shape, or any other suitable shape that would provide advantageous winding characteristics. Thus, the term "concentric" as used herein does not imply that the porous layer or any other fiber layer must be circular. It is noted that fibers of rectangles cross section have been used to make Nd fiber lasers for pumping other fiber lasers. Such a rectangular cross-section enables the fiber 18 to be wound into coils with no or very much reduced interstitial volume and, as will be explained in further detail below, further simplifies the side-pumping feature of the instant invention. It is noted that FIGS. 1 and 2 are provided to show the particular concentric layers in the fibers 10 and 18, and that the proportional size or thickness of the layers shown in the drawings is not necessarily meant to accurately reflect the relative sizes of such layers in actual use. In other words, the relative sizes or thicknesses of the layers 20, 22 and 24 in fiber 18 may vary from that shown, as one skilled in the art will readily understand.

In accordance with the instant invention, the fiber 18 in which the core 20 and cladding 22 are made by the typical process used for, for example, standard telecommunication fiber, which has an additional concentric layer 24 of a porous glass matrix, such as sol-gel produced $SiO_2$, will have the same strength as a totally sol-gel fiber with respect to resistance to damage by handling, such as during a coil winding process, needed to make a fiber laser in the form of a wound pack. The porous material prevents any existing scratches or cracks from propagating from the surface through the fiber 18 and eventually breaking the fiber 18. More particularly, the instant fiber 18 is much less likely to be weakened by handling the fiber without the conventional plastic buffer 16. More particularly, crack propagation requires homogeneous material, and the porous glass matrix material defining layer 24, such as sol-gel, has been found to avoid crack propagation, due to the fact that such porous material is not homogeneous due to the porous nature thereof. Thus, while a sol-gel material is preferred, the outer layer 24 need only have enough porosity to inhibit crack propagation, and any such porous material may be used.

The porous glass matrix layer 24 is preferably applied in a similar manner as the conventional plastic buffer. In other words, the porous material is preferably applied in-line with the process of drawing the fiber from a preform. However, the layer 24 may be applied and cured in any suitable manner.

The instant optical fiber 18 in which the outside layer is fabricated by, for example, a sol-gel process or any other process that will cause crack inhibiting pores in the material, is advantageously used in accordance with the present invention to construct an improved pumped fiber laser in the form of a wound pack.

Figure 3:
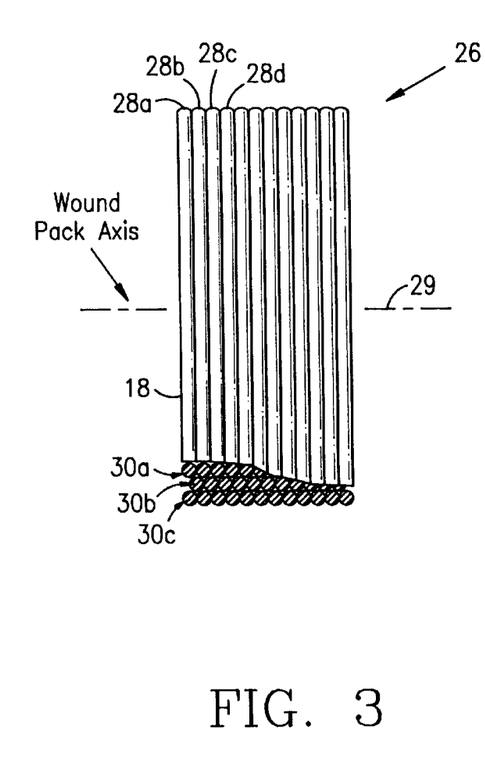
FIG. 3. is a schematic view, partially in cross-section, of one embodiment of a wound pack of optical fiber constructed in accordance with the present invention.

An embodiment of the wound pack is shown in FIG. 3 and generally designated by reference numeral 26. The wound pack 26 includes a plurality of turns (28a, 28b, 28c, 28d, 28e, 28f, for example) of the optical fiber 18 defining a wound pack axis 29. The wound pack 26 may have only one layer of wound turns 30c, or, as shown in FIG. 3, it may have multiple layers 30a, 30b and 30c. Any suitable winding pattern may be used to form the wound pack 26.

Figure 4:
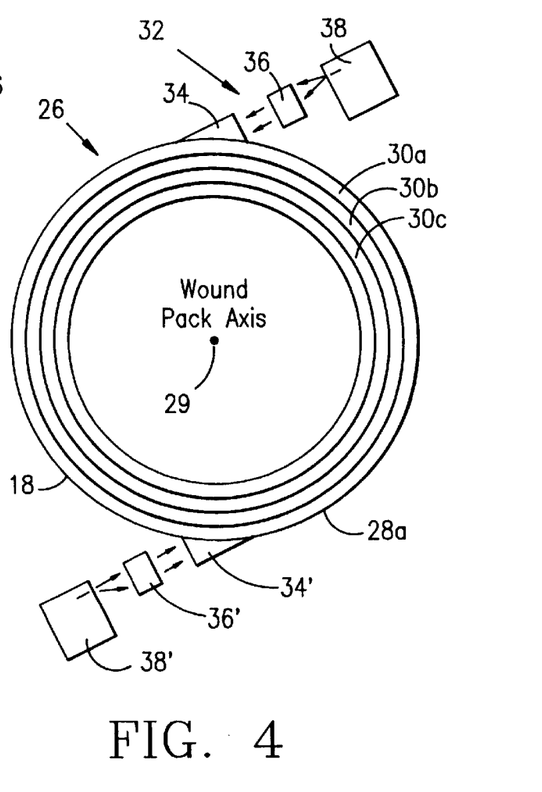
FIG. 4 is a side view of the wound pack of optical fiber shown in FIG. 3. being pumped in accordance with the instant invention.

A view of the wound pack 26 along the wound pack axis 29 is shown in FIG. 4. In addition, FIG. 4 shows the laser pumping elements used to make the pumped laser of in accordance with the present invention. More particularly, pumping of the wound pack 26 is achieved by side pumping the pack 26 using a pumping laser 38, in the form of a semiconductor laser bar, lens elements 36 and a wedge 34.

Optionally (shown in FIG. 4 only), and if desired, a pumping laser 38', in the form of a semiconductor laser bar, lens elements 36' and a wedge 34' may be used to pump the coil wound pack 26 circumferentially spaced 180 degrees from the pumping laser 38. Although not shown, further pumping lasers could be circumferentially spaced around the coil.

Figure 5:
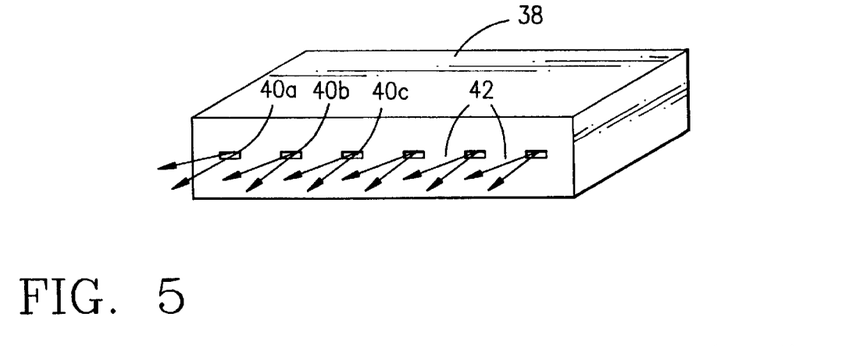
FIG. 5. is a schematic view of the semiconductor laser bar used in connection with a preferred embodiment of the present invention.

A schematic view of the semiconductor laser bar 38 is shown in FIG. 5. The laser bar 38 includes a plurality of lasing regions 40a, 40b and 40c from which light is emitted. Such semiconductor lasers 38 are generally provided in the form of an array of semiconductor laser elements, wherein there is a space between each of the lasing regions 40a–40c defining the array. The extra area resulting from the spaces 42 in the array reduces the radiance of the light emitted therefrom. As a result, it is difficult to get light from several different semiconductor lasers into the end of the fiber, due to the relatively low radiance and the limited available cladding area at the end of the fiber. In other words, while the semiconductor laser bars 38 are very efficient sources of power, the disadvantage is that they are incoherent. As explained above, a problem currently being experienced in connection with such semiconductor pumps for fiber lasers is that the pump 38 have a relatively short useful lifetime, due to degradation resulting from operation at such high levels to achieve the desired radiance needed to end-pump the fiber laser. For telecommunications applications, hundreds of thousands of hours of useful lifetime is desired from such pumps, but currently available pumps only have a lifetime of approximately seven to ten thousand hours of useful lifetime when operated at such high levels. The instant invention provides an improved pumping geometry in combination with an improved wound pack 26 which, as explained below, enables a much longer lifetime for the laser bar 38, by enabling a high power laser to be achieved while operating the pumping laser bar 38 at a lower level than required for conventional end-pumping.

Figure 6:
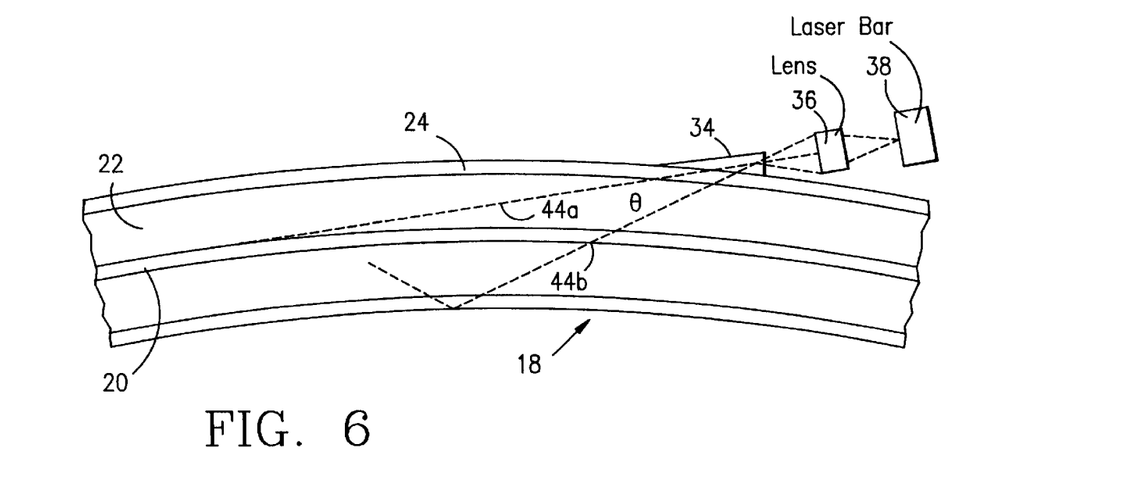
FIG. 6 is an enlarged schematic side view of the fiber optic laser pumping system of the present invention.
Figure 7:
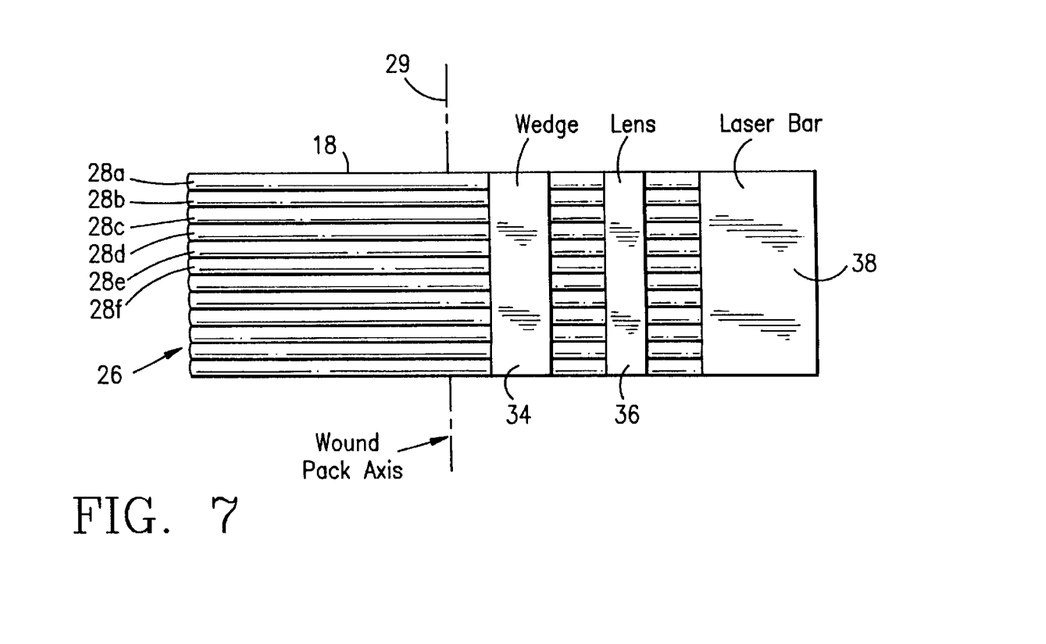
FIG. 7 is a schematic top view of the fiber optic laser pumping system of the present invention.

As shown in FIGS. 6 and 7, and in accordance with the instant invention, light from the laser bar 38 is introduced into the side of the fiber 18 defining the wound pack 26 at a plurality of turns thereon. A wedge element 34 (or numerous individual wedge elements 34) is used to direct the pump light from the laser bar 38 into the side of the fiber cladding. The wedge element 34 is preferably made of glass, but may be made of plastic, and it is connected to the fiber 18 through the use of refractive index matching cement or other adhesive.

One major advantage of this geometry is that the laser diodes in the laser bar 38 can be run at a lower operating point, but in a manner which enables a sufficient amount of pump light to be introduced into the fiber 18. Moreover, the light from the array of diodes in the laser bar 38 can be introduced into the fiber cladding without the need for elaborate focusing and reflecting schemes typically required when such a fiber laser is end pumped with a laser bar 38. The geometry shown enables pumping into the cladding of the fiber, so that the pump radiation can be absorbed by a single mode fiber core that is doped with some lasing material such as $Nd^{+3}$ or $Yb^{+3}$. By pumping into the core as shown it is possible to efficiently use a multi-spatial mode pump source, such as laser bar 38, to obtain a single mode laser output. The invention enables more pump power from a less coherent pump source to be injected into the bound modes of the cladding. Moreover, due to the fact that the fiber is coated with the porous glass matrix material, such as sol-gel, the fiber is not damaged when the wedge 34 is connected thereto.

Due to the relative size of the laser bar 38 as compared to the wedge 34, and the fact that room is needed for heat sink material and other associated electrical contacts, the laser bar 38 is preferably set back slightly from the pack 26. Thus, in order to focus the light into the wedge 34, focusing lenses 36, or other suitable lenses, are used between the laser bar 38 and the wedge 34.

The laser pump source 38 provides pump light to the fiber 18. The core is arranged in a well-known manner to propagate light in single mode at the wavelength of interest and produces, when excited with a sufficient number of photons, laser light output at a wavelength determined by the lasing dopant and the characteristics of the single core acting as a cavity with suitable feedback. The cladding 22 acts as a cladding for the single mode core to confine the pump light in the cladding along the length of the laser. This light is absorbed by the core as it passes through it multiple times. Pump light may be provided by a laser bar, laser diodes, phased array laser diodes, or any other suitable multi-spacial light source.

Light from the laser bar 38 is introduced to a wound pack 26 of fiber 18 as shown in FIG. 6. The pack 26 includes a single layer or multiple layers of fiber 18 that are formed on a mandril (not shown). The fiber 18 preferably includes a single (or multi) mode core surrounded with a cladding that may be circular or somewhat rectangular in cross-section. The core may, for example, comprise pure $SiO_2$ (fused silica) doped with a gain species such as a rate earth, e.g., $Nd^{+3}$ or $Yb^{+3}$. The core may have additional dopants such as aluminum, germanium and phosphorous, which are employed in a known manner to elevate the index of refraction, prevent devitrification or enhance the solubility of $SiO_2$ for rare earth dopants.

In accordance with the instant invention, the pump light is introduced in such a way that it is trapped in the cladding of the fiber, and in such a way that recirculating pump light does not escape. The light is introduced into many positions of the fiber along a line perpendicular to the fiber winding so that most of the light introduced at one point will pass through another position along the fiber where light is also introduced. Thus, increased radiance for the laser over that of the pump source can be attained by the present invention by pumping into the cladding of the fiber laser at multiple locations which presents a larger area into which to pump.

Figure 8:
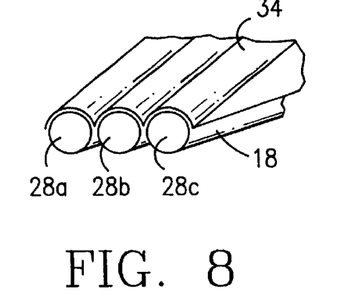
FIG. 8 is a schematic view of one embodiment of the wedge element used in the fiber optic laser pumping system of the present invention.
Figure 9:
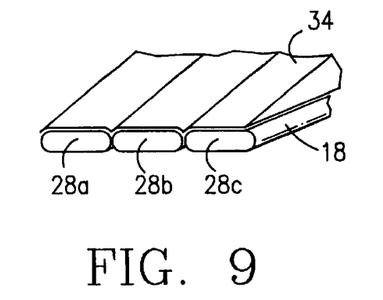
FIG. 9 is a schematic view of an alternative embodiment of the wedge element used in the fiber optic laser pumping system of the present invention.

The laser pump light is introduced through the wedge 34 or mating piece, shown most clearly in FIGS. 8 and 9. The wedge 34 is preferably in the form of a cylinder with a triangular cross-section when a circular fiber is used. The wedge 34 preferably spans several or many fibers, as does the laser bar 38. The wedge 34 is cemented to the fiber 18. The shape of the wedge 34 preferably has a complimentary shape to that of the fiber. For example, the wedge 34 used for a circular fiber should have a cylindrical portion, as shown in FIG. 8. On the other hand, if the fiber is generally rectangular, the wedge 34 has a simpler shape as shown in FIG. 9.

Figure 10:
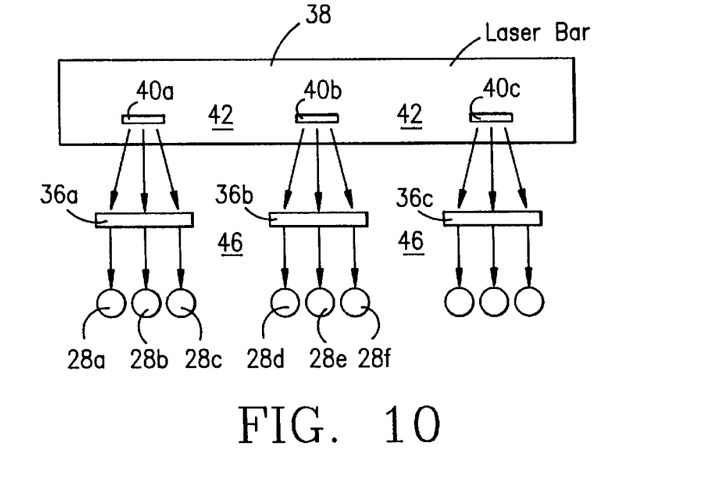
FIG. 10. is a schematic view of one embodiment of the fiber optic laser pumping system of the present invention.

As shown in FIG. 10, the pack 26 is preferably wound such that there are spaces 46 between certain of the turns or windings of the fiber 18, wherein the spaces 46 correspond to spaces 42 between the lasing regions. This is done so that the lenses 36a, 36b and 36c can be focusing lenses that do not spread the light, so that the radiance thereof is not reduced. In the alternative embodiment shown in FIG. 11, other lenses 36a–36c could be used which do spread the light in one plane, so that all of the turns are illuminated by the laser bar light without the need for providing spaces between selected windings. This alternative embodiment, however, has the disadvantage of decreasing the radiance of the light. Other embodiments may also be employed, wherein more than one laser bar is used to illuminate all or many of the turns of the pack 26. For example, the laser bars may be spaced and/or offset from one another around or across the pack 26 to enable light to be introduced into all or substantially all of the turns of the pack 26.

Figure 11:
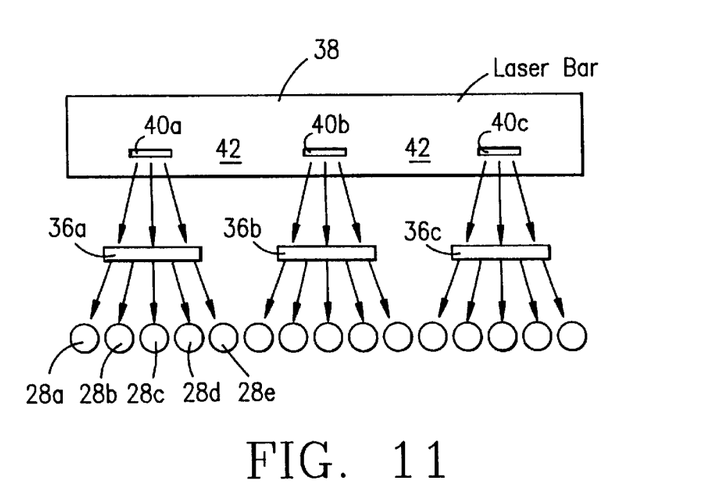
FIG. 11. is a schematic view of an alternative embodiment of the fiber optic laser pumping system of the present invention.

A further alternative to the arrangements of FIGS. 10 and 11 is not shown, but would have the optical fibers arranged as in FIG. 11. However, this alternate would use a pumping laser source having pumping lasers circumferentially spaced from one another. For example, and referring back momentarily to FIG. 4, pumping laser 38 could pump turns 1 to 3, 7 to 9, 13 to 16, etc. and pumping laser 38' could pump turns 4 to 6, 10 to 12, 17 to 19, etc. The pumping of the different turns in the coil could be achieved by offsetting the lasing regions of the bars in a coil axis direction and/or simply by the pitch of the turns in the coil.

The entire wound pack 26 is preferably fastened together with an adhesive, such as a low temperature melting glass or low refractive index plastic. It is advantageous for the whole pack 26 and any adhesive used to be of low optical absorption and that it have smooth surfaces and material interfaces to conserve light so that it is absorbed by the doped fiber core instead of being scattered outside the pack. It is noted that the light from the pump 38 enters at an angle from the fiber axis, and thus does not fill-up all the modes of the cladding. The limits of the pump beam angle is shown by the dotted lines 44a and 44b in FIG. 6, as an example of such limitation. The entire pack may additionally be coated with a reflector, either specular or diffuse, to help keep light within the fiber.

While the preferred forms and embodiments of the invention have been illustrated and described, it will be apparent to those of ordinary skill in the art that various changes and modifications may be made without deviating from the inventive concepts and spirit of the invention as set forth above, and it is intended by the appended claims to define all such changes and modifications which come within the full scope and true spirit of the invention.

What is claimed is:

1. A pumped fiber laser, comprising turns of optical fiber defining a wound pack, wherein said optical fiber includes a core and a cladding around said core said fiber laser further including a pumping laser having lasing regions each being operable to generate light, and means for directing said light from said lasing regions into a side of said optical fiber at a plurality of different turns of said turns of the optical fiber, respectively; and wherein said means for directing said light includes a wedge, wherein said wedge extends across at least one turn of said optical fiber and has a complimentary shape to that of said optical fiber.

2. A pumped fiber laser as defined in claim 1, said optical fiber further including a concentric layer of a porous glass matrix material around said cladding, and wherein said porous glass matrix material is a sol-gel material.

3. A pumped fiber laser as defined in claim 2, wherein said sol-gel material comprises an outer-most layer of said optical fiber.

4. A pumped fiber laser as defined in claim 1, said optical fiber further including a concentric layer of a porous glass matrix material around said cladding, and wherein said porous glass matrix material comprises an outer-most layer of said optical fiber.

5. A pumped fiber laser as defined in claim 1, wherein said pumping laser has a length which enables said lasing regions to illuminate all of said turns of optical fiber defining said wound pack.

6. A pumped fiber laser as defined in claim 5, wherein said pumping laser is a semiconductor laser bar.

7. A pumped fiber laser as defined in claim 1, wherein said pumping laser is a semiconductor laser bar.

8. A pumped fiber laser as defined in claim 1, wherein said core is a single mode fiber core.

9. A pumped fiber laser as defined in claim 1, wherein said optical fiber is wound around a mandrel to form said wound pack.

10. A pumped fiber laser as defined in claim 1, said optical fiber further including a concentric layer of a porous glass matrix material around said cladding, and wherein said optical fiber includes a concentric layer of silicone around said layer of porous glass matrix material to enable a large range of angles of said light to be trapped in said fiber, said silicone having a low refractive index relative to said cladding.

11. A pumped fiber laser as defined in claim 1, wherein said turns are wound with selective spaces between certain of said turns, wherein said spaces correspond to spaces between said lasing regions of said pumping laser.

12. A pumped fiber laser, comprising turns of optical fiber defining a wound pack, wherein said optical fiber includes a core, a cladding around said core and a concentric layer of a porous glass matrix material around said cladding, said fiber laser further including a pumping laser having lasing regions each being operable to generate light, and means for directing said light from said lasing regions into a side of said optical fiber at a plurality of different turns of said turns of the optical fiber, respectively, and wherein said means for directing said light includes a wedge, wherein said wedge extends across at least one turn of said optical fiber and has a complimentary shape to that of said optical fiber.

13. A pumped fiber laser as defined in claim 12, wherein said means for directing said light further includes a lens element between said pumping laser and said wedge.

14. A pumped fiber laser as defined in claim 13, wherein said lens element is a focusing lens element which focuses said light into said wedge.

15. A pumped fiber laser as defined in claim 13, wherein said lens element is a spreading lens which spreads said light in one dimension so as to illuminate a plurality of said turns of said optical fiber with said light from each of said lasing regions, respectively.

16. A pumped fiber laser as defined in claim 12, wherein said wedge is connected to said side of said optical fiber with a refractive index matching adhesive.

17. A pumped fiber laser, comprising turns of optical fiber defining a coil wound pack having a coil axis, wherein said optical fiber includes a core and a cladding around said core, said fiber laser further including a pumping laser source directing pumping laser energy into a plurality of the turns of optical fiber and wherein the pumping laser energy is directed towards the coil wound pack from a plurality of locations separated from each other in the coil axis direction; and wherein a means for directing said laser energy includes a wedge, wherein said wedge extends across at least one turn of said odtical fiber and has a complimentary shape to that of said optical fiber.

18. A pumped fiber laser as defined in claim 17, wherein said pumping laser source is a semiconductor laser bar.

19. A pumped fiber laser as defined in claim 18, wherein the pumping laser source has lasing regions each being operable to generate light, and further comprising means for directing said light from said lasing regions into a side of said optical fiber at a plurality of different turns of said turns of the optical fiber, respectively.

20. A pumped fiber laser as defined in claim 17, wherein said pumping laser source directs the pumping laser energy at different circumferential points in the coil wound pack.

* * * * *

UNITED STATES PATENT AND TRADEMARK OFFICE
CERTIFICATE OF CORRECTION

PATENT NO. : 5,923,694
DATED : July 13, 1999
INVENTOR(S) : William H. CULVER

It is certified that error appears in the above-indentified patent and that said Letters Patent is hereby corrected as shown below:

On Cover Page, the Assignee should be changed from "Opteleacom, Inc."

to -- Optelecom, Inc. --;

Claim 17, line 11, (column 11, line 7), change "odtical" to

-- optical --.

Signed and Sealed this

First Day of February, 2000

Attest:

Q. TODD DICKINSON

*Attesting Officer*  *Acting Commissioner of Patents and Trademarks*